United States Patent [19]

Maan

[11] Patent Number: 4,818,069
[45] Date of Patent: Apr. 4, 1989

[54] ASSEMBLY OF A FIRST ELEMENT TO A SECOND ELEMENT BY ADHESIVE AND A WEDGE-SHAPED BODY

[75] Inventor: Nicolaus Maan, Eindhoven, Netherlands

[73] Assignee: U.S. Philips Corporation, New York, N.Y.

[21] Appl. No.: 98,645

[22] Filed: Sep. 21, 1987

[30] Foreign Application Priority Data

May 21, 1987 [NL] Netherlands ................ 8701211

[51] Int. Cl.$^4$ ............................................. G02B 27/00
[52] U.S. Cl. ............................................ 350/321; 350/252; 350/255; 369/45; 248/148
[58] Field of Search ............... 350/321, 252, 253, 255, 350/247, 96.15, 96.17; 369/44–46; 248/148, 371

[56] References Cited

U.S. PATENT DOCUMENTS

| 4,554,653 | 11/1985 | Malissin et al. | 350/247 |
| 4,557,564 | 12/1985 | Van Rosmalen | 350/247 |

FOREIGN PATENT DOCUMENTS

| 60-257402 | 12/1985 | Japan | 350/252 |
| 61-223716 | 10/1986 | Japan | 350/252 |

*Primary Examiner*—John K. Corbin
*Assistant Examiner*—Loha Ben
*Attorney, Agent, or Firm*—F. Brice Faller

[57] ABSTRACT

A wedge-shaped body (35) having profiled surfaces (37, 39) facing first and second elements is interposed between the first and second elements. The surfaces have first surface portions (37A, 39A) against which the elements abut and second surface portions (37B, 39B) which together with the elements define gaps (61) in which adhesive is applied to join the elements and the second surface portions.

11 Claims, 2 Drawing Sheets

ASSEMBLY OF A FIRST ELEMENT TO A SECOND ELEMENT BY ADHESIVE AND A WEDGE-SHAPED BODY

BACKGROUND OF THE INVENTION

The invention relates to an assembly comprising a first element to which a second element is secured by means of an adhesive.

European Patent Application No. 0,090,218 discloses an optical assembly with an optical component with two divider prisms and a part of an apparatus, an adhesive being applied in the gap between the optical component and the part.

In optical assemblies used in optical apparatus such as optical-disc players it is important that the various optical elements therein are positioned correctly relative to one another. For production reasons it is therefore essential that the optical elements in such assemblies are disposed at the correct predetermined location and in the correct position relative to, for example, a reference plane. Important in this respect is the positional accuracy in the direction of the optical axis (Z-direction) of the optical assembly, in the directions of two axes which extend perpendicularly to the optical axis and to one another (X-direction and Y-direction), and in the directions of rotation about the latter axes.

The known assembly has the drawback that inevitable shrinkage in the applied adhesive as it cures may give rise to comparatively large displacements of the optical component in the Z-direction. Moreover, the likelihood of the optical component being tilted about the X and Y axes is considerable as a result of shrinkage stresses arising in the adhesive layer. The positioning problem can be reduced to some extent by making the adhesive layer thin in the Z direction, but the desired position of the optical component and the required strength and stability of the adhesive bond impose distinct restraints on this. A suitable choice of the adhesive may also reduce said problem, but wholly eliminating shrinkage and shrinkage stresses is impossible.

SUMMARY OF THE INVENTION

It is the object of the invention to improve the construction of the optical assembly so that it can be manufactured in a very accurate and reproducible manner so that the assembly is suited for use in systems and apparatuses in which elements have to be positioned within very close tolerances. A wedge-shaped body having profiled surfaces facing the element is interposed between the first element and the second element, the surfaces comprising first surface portions against which the elements abut and second surface portions which together with the elements form adhesive gaps in which the adhesive by means of which the elements and the second surface portions are joined to each other is applied.

The adhesive is present in predetermined narrow gaps between the wedge-shaped body and the elements, the cured adhesive ensuring that the elements are drawn against the two surface portions of the wedge-shaped body. This has the advantage that one element is located and positioned very accurately relative to the other element after curing of the adhesive. Shrinkage stresses arising during curing only have a negligible influence on the final position of the elements in the construction.

The first and second elements may vary widely in nature, such as diodes, lenses, and mirrors, and still comply with stringent tolerance requirements.

The first surface portions and the second surface portions may be separated from each other by grooves. For the sake of clarity it is to be noted that no adhesive is present between the first surface portions and the wedge-shaped body. An advantage of the grooves is that they facilitate the selective application of the adhesive. Moreover, during manufacture of the assembly the grooves prevent amounts of adhesive from migrating from the second to the first surface portions by capillary action.

The wedge-shaped body may have two limbs, the surfaces being disposed at an acute angle relative to one another. Suitably, one of the limbs of the wedge-shaped body is constructed as a leaf spring to compensate for minor displacements as a result of temperature variations.

Another favourable and stable embodiment is characterized in that during curing the adhesive applied in said gaps exhibits a shrinkage which is greater than the expansion of the cured adhesive in the temperature range for which the assembly is intended. Suitable types of adhesive are, for example, UV-curable adhesives such as acrylates.

Material stresses can be minimized if the wedge-shaped body and at least one of the elements are made of the same material.

The invention further relates to a device for recording and/or reading information in an information surface of a disc rotating about an axis of rotation by means of a radiation spot, comprising a frame, a rotary drive means for the disc with a spindle which is rotatable about an axis of rotation, an optical system with a lens system which has an optical axis and which is movable parallel to and transversely of said information surface, and a lens-system drive means. Such a device is known, for example, from British Patent Application No. 2,161,641, to which U.S. Pat. No. 4,691,311 corresponds, herewith incorporated by reference.

The device in accordance with the invention is characterized by the presence of the assembly in accordance with the invention, at least one of the elements comprising an optical or opto-electronic component, for example a read diode. The device in accordance with the invention has the advantage that the optical component is mounted in the device exactly at the predetermined location with a high accuracy and stability and in a reproducible manner.

DETAILED DESCRIPTION OF THE INVENTION

Figure 1:
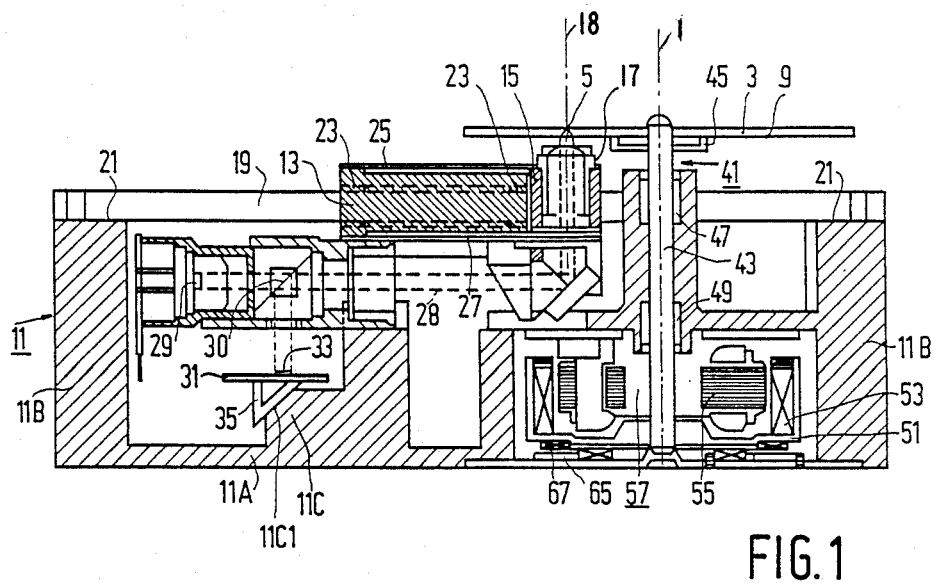
FIG. 1 is a sectional view of the device.

The device shown in FIG. 1 serves for optically reading a disc 3, which is rotatable about an axis of rotation 1, by means of a radiation spot 5. The disc 3 comprises a transparent substrate whose upper side is provided with an information surface 9 which is coated with a reflecting layer. The disc may be, for example, a CD or a CDV.

The device comprises a frame 11 and a lens-system drive means 13 which is translatable relative to the frame along a radial path. The lens-system drive means or drive 13 comprises a movable lens support 15 with a lens system 17 which is movable transversely of the disc 3. The rectilinear guide of the lens-system drive 13 comprises two parallel rods 19, of which only one rod is visible in FIG. 1, which rods are secured to mounting faces 21 of the frame 11. The lens-systems drive 13 further includes magnets and coils, not shown, and is provided with sleeve bearings 23 by means of which the drive 13 is movable over the rods. The lens support 15, which is provided with actuator coils, not shown, is supported on the lens-system drive means 13 by leaf springs 25 and 27 at its upper and lower side respectively, which leaf springs are secured to the lens support 15 and to the lens-system drive means 13 at their respective ends. The lens support 15 together with the lens system 17 is movable to a limited extend along the optical axis 18 of the lens system 17.

The lens system 17 is movable along its optical axis 18 under servo control to enable the movements of the disc 3 to be followed with the radiation spot 5 formed by a radiation beam 28. For a more comprehensive description of the lens-system drive means and the lens system, reference is made to Netherlands Patent Application No. 82 04 366, to which U.S. Pat. No. 4,443,721 corresponds herewith incorporated by reference. The radiation beam 28 is emitted by a stationary radiation source 29, for example a semiconductor laser, and passes through a semitransparent mirror 30. A semiconductor diode 33 arranged on a printed-circuit board 31 serves for converting the radiation-beam modulation into an electrical modulation. For a description of the construction and operation of optical systems suited for the conversion between optical and electrical modulations reference is made to the existing literature on this subject.

Figure 2:
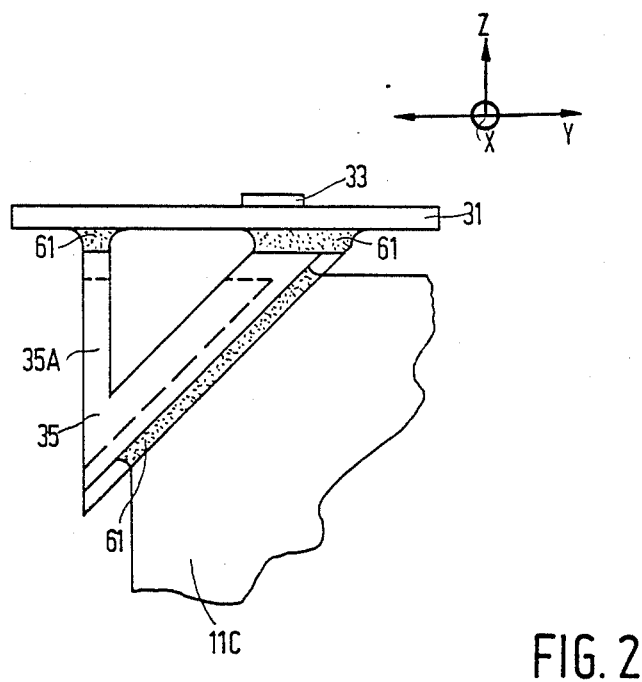
FIG. 2 is an enlarged-scale partial section view of the assembly used in the device.
Figure 3C:
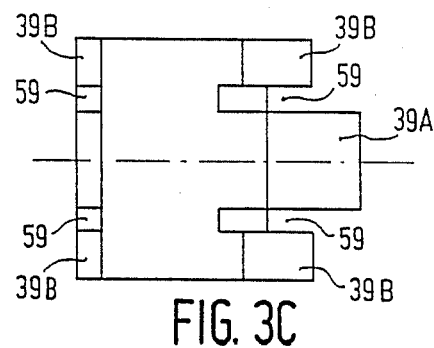
FIG. 3C is a view as indicated by the arrows IIIC—IIIC in FIG. 3A.
Figure 3B:
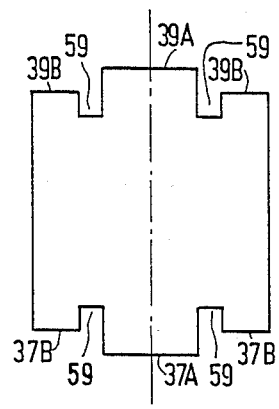
FIG. 3B is a view as indicated by the arrows IIIB—IIIB in FIG. 3A.
Figure 3A:
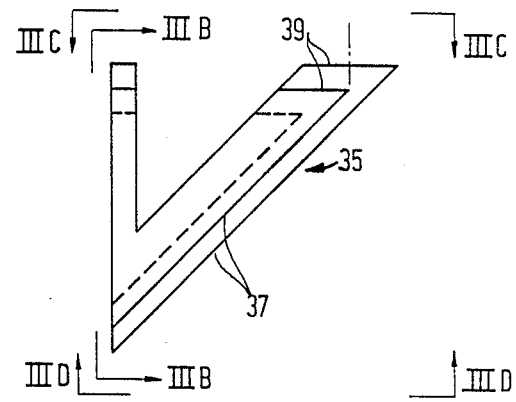
FIG. 3A is a side view of the wedge-shaped body of the assembly shown in FIG. 2.
Figure 3D:
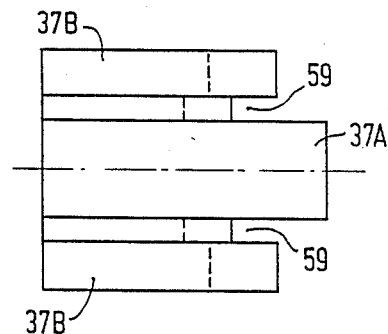
FIG. 3D is a view as indicated by the arrows IIID—IIID in FIG. 3A.

The frame 11, which may be manufactured by diecasting from a suitable material, has a substantial open box-shape with a profiled bottom 11A and side walls 11B. The frame 11 further comprises a frame portion 11C provided with an inclined surface 11C1, to which a wedge-shaped body 35 is glued. The printed-circuit board 31 carrying the semiconductor diode 33 is glued to the wedge-shaped body 35. It is essential that the diode 33 is in the correct position relative to the radiation beam which is directed towards the printed circuit board 31 by the semitransparent mirror 30. The assembly comprising the diode 33 mounted on the printed circuit board 31, the wedge-shaped body 35 and the frame portion 11C is shown to an enlarged scale in FIG. 2.

The device in accordance with the invention further comprises a drive means 41 for rotating the disc 3. The drive means 41 comprises a spindle 43 which is rotatable about the axis of rotation 1, on which spindle a turntable 45 for supporting the disc 3 is mounted. The rotatable spindle 43 is journalled in the frame 11 by means of two bearing bushes 47 and 49, which are clamped in the frame. In the present construction the spindle 43 also constitutes the motor shaft and carries a rotor 51. The rotor 51 has a cylindrical magnet 53 which cooperates with a stator 55 which is secured to the frame 11. The rotor 51 and the stator 55 forms part of an electric-motor unit 57.

The wedge-shaped body 35 shown in FIG. 2 and FIGS. 3A to 3D has two profiled surfaces 37 and 39, which are disposed at an acute angle to one another. The surface 37 faces the frame portion 11C, while the surface 39, which in the present example comprises two spatially separated parts, faces the printed circuit board 31. The surfaces 37 and 39 each comprise a first surface portion 37A and 39A respectively and two surface portions 37B and 39B respectively. The surface portions 37A and 37B and the surface portions 39A and 39B are spaced from each other by parallel grooves 59 in the surfaces 37 and 39. Together with the surface portions 37B and 39B the printed circuit board 31 and the frame portion 11C define gaps 61 in which a cured adhesive is present. The adhesive provides the connection of the elements 31 and 11C to the wedge-shaped body 35, while the wedge-shaped body 35 itself, by means of the surface portions 37A and 39A against which the elements 31 and 11C abut, ensures that the diode 33 occupies the desired position. During manufacture, before the adhesive is allowed to cure, the wedge-shaped body 35 is therefore moved in such a way relative to the frame portion 11C in the Z-direction (FIG. 2) and the printed circuit board 31 is moved in such a way relative to the wedge-shaped body 35 in the X-direction and in the Y-direction, that the diode 33 is situated at exactly the desired location.

In the present example, as is clearly visible in the drawings, the wedge-shaped body 35 comprises two limbs, one of the limbs 35A behaving as a leaf spring. The wedge-shaped body 35 and the frame portion 11C are manufactured from a metal such as a magnesium alloy.

Obviously the invention is not limited to the embodiments shown. For example, it is possible to use the assembly in accordance with the invention in an optical device in which the objective is not movable parallel to the disc by means of a slide as shown in FIG. 1, but is movable by means of a pivotable element. Such a device is described in European Patent Application No. 0.143.483, to which U.S. Pat. No. 4,557,564 corresponds, herewith incorporated by reference.

What is claimed is:

1. An assembly comprising a first element to which a second element is secured by means of an adhesive and a third element comprising a wedge-shaped body, said body having profiled surfaces facing said first and second elements and being interposed therebetween, said surfaces comprising first surface portions against which said first and second elements abut, and second surface portions which together with said first and second elements form adhesive gaps in which the adhesive is applied to join said first and second elements and the second surface portions.

2. An assembly as claimed in claim 1 wherein the first surface portions and the second surface portions are separated from each other by grooves.

3. An assembly as claimed in claim 1 or 2 wherein the wedge-shaped shaped body comprises two limbs, the said surfaces being disposed at an acute angle relative to one another.

4. An assembly as claimed in claim 3, wherein one of the limbs of the wedge-shaped body is constructed as a leaf spring.

5. An assembly as claimed in claim 1, wherein during curing the adhesive applied in said gaps exhibits a shrinkage which is greater than the expansion of the cured adhesive in the temperature range for which the assembly is intended.

6. An assembly as claimed in claim 5, wherein the adhesive is of an UV-curable type.

7. An assembly as claimed in claim 1, wherein the wedge-shaped body and at least one of the said first and second elements are made of the same material.

8. An assembly as claimed in claim 1, wherein one of said first and second elements forms part of a frame.

9. An assembly as claimed in claim 1, wherein at least one of said first and second elements comprises an optical or opto-electronic component.

10. A device for recording and/or reading information in an information surface of a disc by means of radiation spot, comprising a frame, a rotary drive means with a spindle having an axis of rotation, an optical system with a lens system which has an optical axis and which is movable parallel to and transversely of said information surface, and a lens-system drive means, said device further comprising a first element to which a second element is secured by means of an adhesive and a third element comprising a wedge-shaped body, said body having profiled surfaces facing said first and second elements and being interposed therebetween, said surfaces comprising first surface portions against which said first and second elements abut, and second surface portions which together with said first and second elements form adhesive gaps in which the adhesive is applied to join said first and second elements and the second surface portions.

11. A device as claimed in claim 10, wherein one of said first and second elements comprises a printed circuit board carrying a read diode and the other of said first and second elements is a part of the frame of the device.

* * * * *